US012198477B1

(12) United States Patent
Dugar et al.

(10) Patent No.: US 12,198,477 B1
(45) Date of Patent: Jan. 14, 2025

(54) VEHICLE DIAGNOSTICS AND MALFUNCTIONS MANAGEMENT

(71) Applicant: Samsara Inc., San Francisco, CA (US)

(72) Inventors: Aditi Dugar, Redwood City, CA (US); Adam Pramono, Santa Clara, CA (US); Eileen Zhong, Castro Valley, CA (US); Prasad Shinde, San Jose, CA (US); Caleb Siu, Emeryville, CA (US); Sachie Weber, San Francisco, CA (US); Nicholas Murray, San Francisco, CA (US); Michael Luis Innocenzi, San Francisco, CA (US); Xin Chen, New York, NY (US); Philippe Savoie, Belmont, CA (US); Semur Nabiev, Sarasota, FL (US); Grant Kalasky, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 225 days.

(21) Appl. No.: 17/823,194

(22) Filed: Aug. 30, 2022

Related U.S. Application Data

(60) Provisional application No. 63/369,454, filed on Jul. 26, 2022.

(51) Int. Cl.
*G07C 5/08* (2006.01)
*G07C 5/00* (2006.01)

(52) U.S. Cl.
CPC ........... *G07C 5/008* (2013.01); *G07C 5/0808* (2013.01); *G07C 5/0825* (2013.01)

(58) Field of Classification Search
CPC ..... G07C 5/008; G07C 5/0808; G07C 5/0825
See application file for complete search history.

(56) References Cited

U.S. PATENT DOCUMENTS

| | | | | |
|---|---|---|---|---|
| 2008/0084285 A1* | 4/2008 | Bhogal | B60C 11/24 | 340/505 |
| 2017/0024937 A1* | 1/2017 | Ramesh | B60L 58/12 | |
| 2020/0066069 A1* | 2/2020 | Kapoor | G07C 5/085 | |
| 2021/0001810 A1* | 1/2021 | Rivard | G06V 40/172 | |
| 2021/0125428 A1* | 4/2021 | Tedesco | G07C 5/0808 | |
| 2021/0133676 A1* | 5/2021 | Myers | G06Q 10/0633 | |
| 2021/0192867 A1* | 6/2021 | Fang | G07C 5/0816 | |
| 2022/0139137 A1* | 5/2022 | Johnson | G07C 9/00857 | 340/5.25 |
| 2022/0319255 A1* | 10/2022 | Palai | G07C 5/008 | |
| 2023/0012186 A1* | 1/2023 | Siegel | G07C 5/0833 | |
| 2023/0106268 A1* | 4/2023 | Venkatesh | G01C 21/3856 | 701/23 |

* cited by examiner

*Primary Examiner* — Ashley L Redhead, Jr.
(74) *Attorney, Agent, or Firm* — Schwegman Lundberg & Woessner, P.A.

(57) ABSTRACT

Disclosed are systems, methods, and non-transitory computer-readable media for managing diagnostics and malfunctions of a vehicle. A route management system detects an event representing an improper operation of an electronic logging device (ELD) of a vehicle; in response to detecting the event: generates, for display, a notification representing the event to a driver of the vehicle; retrieves instructions for resolving the improper operation of the ELD; presents the instructions as part of the notification; and coordinates communicating the event and resolution status of the event to a fleet manager of the vehicle.

20 Claims, 10 Drawing Sheets

VEHICLE DIAGNOSTICS AND MALFUNCTIONS MANAGEMENT

PRIORITY APPLICATION

This application claims priority to U.S. Provisional Patent Application Ser. No. 63/369,454, filed on Jul. 26, 2022, the disclosure of which is incorporated by reference herein in its entirety.

TECHNICAL FIELD

Embodiments of the present subject matter relate generally to vehicles and, more specifically, to managing diagnostics and malfunctions (D&M) of vehicles.

BACKGROUND

Fleet managers track the movement of their vehicles to ensure that they are operating as expected. For example, fleet managers may track whether a vehicle began a route at an expected time, arrived at scheduled stops along the route, and completed the route. This process is often performed manually; however, systems have been developed to automate this process. These systems utilize geofences to determine when a vehicle has arrived and/or departed a scheduled stop. In some cases, a vehicle may be scheduled to stop at multiple locations that are within a proximity of each other. For example, a delivery truck may be scheduled to deliver packages at multiple stores located in the same shopping center.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
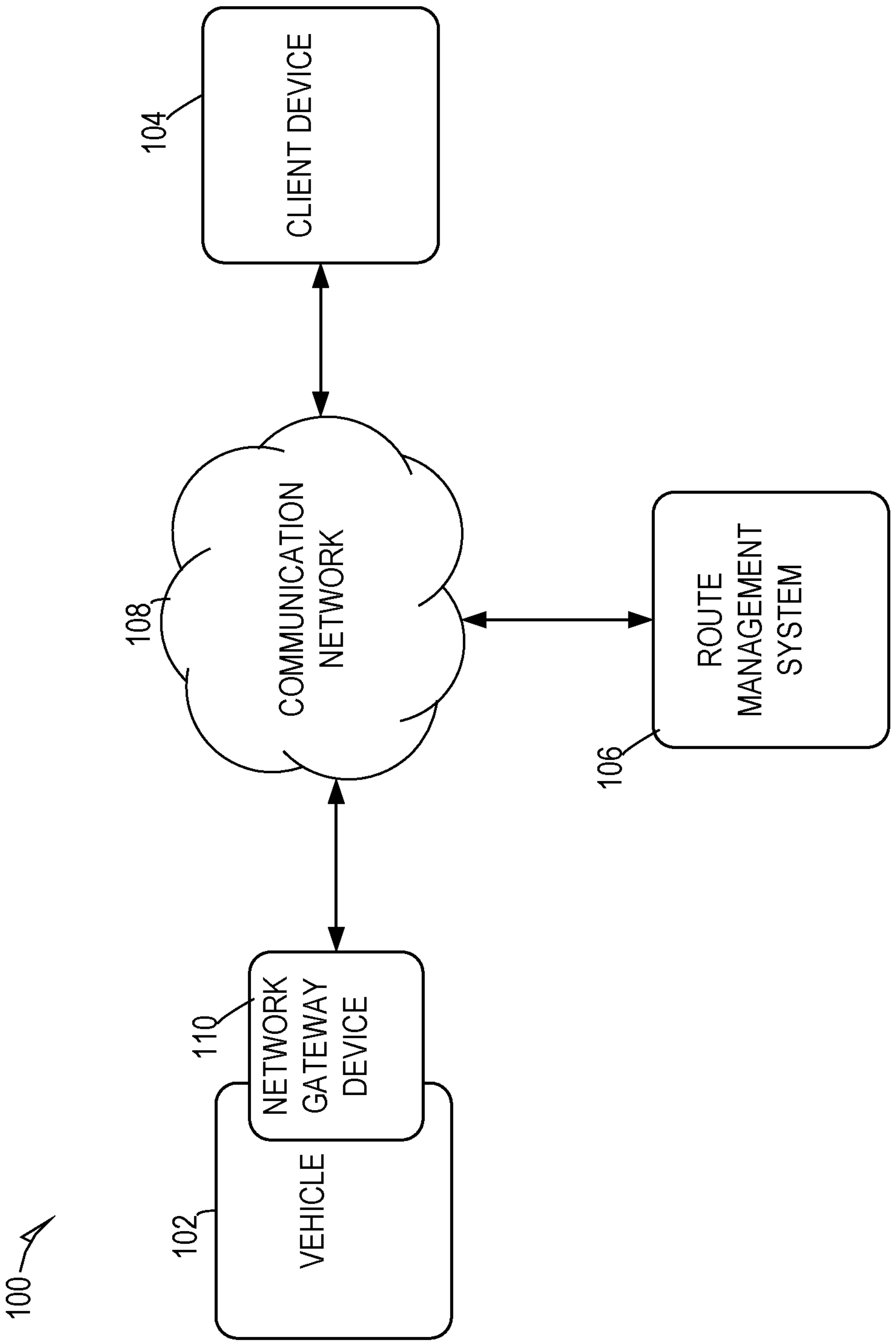
FIG. 1 shows a system for managing electronic logging device (ELD) events of vehicles, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations. Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" in various places throughout the specification are not necessarily all referring to the same embodiment and the embodiments can be combined with each other.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for managing ELD events of vehicles. A route management system provides for detecting one or more events representing improper operation of an ELD of a vehicle, such as D&M events. The route management system can present a user interface to a driver of the vehicle to resolve the improper operation and can coordinate the resolution of the improper operation with a fleet manager.

The route management system uses the set of route variables defining each route along with sensor data describing the geographic location and/or movement of the vehicles to generate route tracking reports. The route tracking reports can be generated based on electronic logging device (ELD) data associated with certain vehicles. A route tracking report is a file or document that includes the ELD data indicating the movement of a vehicle in relation to its assigned route. For example, the route tracking report may indicate whether a vehicle began and/or ended its route on time, arrived at each of its scheduled stops, arrived and/or departed from each scheduled stop on time, completion status of each stop (e.g., whether the stops are in a completed state or incomplete state), completed the route in the correct order, the list of stops and their associated locations remaining on the route, the amount of time the vehicle was driven in a regulated or unregulated vehicle regulation mode, hours of service of the driver, and the like.

In some cases, vehicles encounter D&M events. Different regulatory authorities (e.g., different countries) have different requirements for addressing D&M events. For example, in the United States, malfunctions may need to be resolved by the carrier within 8 days before removing the vehicle from rotation. In Canada, both diagnostics and malfunctions may need to be resolved within 14 days before the vehicle is removed from rotation. Resolving D&M events involves actions by both the drivers and the administrators (e.g., fleet managers). Lack of coordination and communication between the drivers and administrators with respect to D&M events can lead to lack of compliance and violation of regulations. Typical systems provide no mechanism for seamlessly coordinating D&M events. Specifically, typical systems require the drivers to inform the administrators when they encounter D&M events and to obtain information on how to resolve the D&M events. This makes compliance with rules difficult and cumbersome for drivers. As a result, vehicles may be operated in a manner that fails to comply with the rules and regulations and can lead to severe consequences.

In addition, even when the drivers in typical systems do inform the administrators about D&M events, both parties are left to guess how to resolve the D&M events properly. This can involve multiple phone calls back and forth between the drivers and the administrators which wastes a great deal of time and can be extremely burdensome on the drivers and administrators. Overall, administrators spend a great deal of time manually collecting D&M information from various drivers which further exacerbates the risk of lack of compliance for vehicles. For example, administrators need to be aware of the D&M events across their fleet which includes waiting for drivers to call informing the administrators about the D&M events. The administrators need to instruct the drivers to provide written notice about the D&M events and troubleshoot the resolution to the D&M events by calling the drivers directly and verbally explaining the resolution process. Then, the administrators need to prepare logs for the day and keep a six month register of D&M events. This manual process is extremely tedious and time consuming.

There is no seamless and straightforward mechanism for drivers to resolve D&M events and to coordinate such resolution with the fleet managers or administrators. To resolve the D&M events, drivers typically need to be aware of the rules and regulations, and search for the correct solutions by manually navigating through multiple pages of information. This ends up frustrating the drivers and the drivers may be discouraged from driving or navigating routes in an efficient manner. Also, drivers that do navigate through the multiple pages of information to other routes waste system resources that can be dedicated to other tasks.

To alleviate this issue, the route management system provides for a system, including a graphical user interface (GUI), that simplifies the D&M event handling operations and management. For example, the route management system detects an event representing an improper operation of an ELD of a vehicle. In response to detecting the event, the route management system generates, for display in the GUI of the driver, a notification representing the event to a driver of the vehicle. The route management system also retrieves instructions for resolving the improper operation of the ELD and presents the instructions as part of the notification to the driver. This alleviates the issue of having drivers search for proper resolutions to certain D&M events and expedites the resolution process. In addition, the route management system coordinates communicating the event and resolution status of the event to a fleet manager of the vehicle. In this way, the drivers are not burdened with having to contact the administrators or fleet managers about the D&M events and their status which saves time and resources as this information is automatically communicated and coordinated.

By providing an easy-to-use GUI for handing and managing D&M events, drivers are better equipped to manage their deliveries and personal time and comply with rules and regulations. Also, the amount of pages of information that a driver needs to navigate through is reduced, which makes operating the system more efficient and reduces the amount of resources needed to accomplish a task. This can improve the operational efficiency of the route management system by reducing call volumes between drivers and dispatchers requesting status updates for D&M events, alleviating the dispatchers' burden and enabling them to handle other tasks.

FIG. 1 shows a system 100 for managing ELD events of vehicles, according to some embodiments. As shown, multiple devices (e.g., vehicle 102, client device 104, and route management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, a wearable device, a watch, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, bicycle, motorcycle, skateboard, semi-trailer truck, plane, bus, train, ship, a vessel, and the like. As shown, the vehicle 102 includes a network gateway device 110 (e.g., vehicle gateway) that allows for remote communication between the vehicle 102 and one or more remote computing devices via the communication network 108. The vehicle can send ELD data such as D&M events to the client device 104 and/or the route management system 106 including an administrator or fleet manager device.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs)), actuators, etc. deployed within the vehicle 102. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality, by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture ELD data describing performance of a vehicle 102 and its surroundings. For example, the sensors may include engine speed sensors, fuel temperature sensors, voltage sensors, pressure sensors, radar sensors, location sensors, global positioning system (GPS) sensors that provide a current geographical location of the vehicle 102, light detection and ranking (LIDAR) sensors, imaging sensors (e.g., camera, video camera), and the like.

The route management system 106 is one or more computing devices that allow for generation and management of routes as well as automated route tracking and managing ELD events of one or more vehicles 102. For example, the route management system 106 may allow administrators to generate routes and assign the generated routes to vehicles 102. The route management system 106 may also provide automated route tracking of the vehicles 102 based on the assigned routes. The route management system 106 may also enable operators, route managers, and drivers to access and view assigned past, present, and future routes. In some cases, the route management system 106 can determine whether the vehicle 102 is in a certain region or on a certain road that is associated with regulated vehicle operating mode. In such cases, the route management system 106 can instruct the vehicle 102 (and/or ELD) to switch vehicle regulation modes to the regulated vehicle regulation mode and begin storing data from the ELD. The route management system 106 can annotate the data stored from the ELD with the reason for switching, such as the identification of the region or road that is associated with the regulated vehicle operating mode.

In some examples, the route management system 106 can detect that an ELD event has been triggered. For example, the route management system 106 can implement one or more conditions associated with D&M (or malfunction and diagnostics (M&D)) events. The route management system 106 can receive data from a vehicle 102, such as via the communication network 108. The route management system 106 can compare the data to the one or more conditions to determine whether the data corresponds to one or more conditions. In response to determining that the data corresponds to the one or more conditions, the route management system 106 triggers a D&M event. In such cases, the route management system 106 can trigger and present a notification on a client device 104 of a driver or a display of the vehicle 102. The notification can identify the D&M event that has been triggered. The route management system 106 can also search for known resolutions or ways to address the particular D&M event. The route management system 106 can generate a set of instructions based on the known resolution and present those instructions in a user interface on the client device 104.

The route management system 106 can also notify or transmit a communication to an administrator, such as a fleet manager device which can be implemented by another client device 104. The route management system 106 can coordinate the D&M event between the vehicle 102 and the fleet manager device. In this way, the fleet manager device can remain informed about the status of the resolution to the D&M event. This reduces the level of manual coordination between drivers and dispatchers or fleet managers which increases the overall efficiency of the system.

To utilize the functionality of the route management system 106, users (e.g., fleet managers, drivers, or operators) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the route management system 106 may concurrently accept communications from and initiate communication messages to and/or interact with any number of client devices 104 and vehicles 102, and support connections from a variety of different types of client devices 104, such as desktop computers; mobile computers; mobile communications devices, e.g., mobile phones, smart phones, wearables, watches, glasses, tablets; smart televisions; set-top boxes; and/or any other network enabled computing devices. Hence, the client devices 104 may be of varying type, capabilities, operating systems, and so forth.

A user (or driver) interacts with a route management system 106 via a client-side application installed on the client device 104. In some embodiments, the client-side application includes a component specific to the route management system 106. For example, the component may be a stand-alone application, one or more application plug-ins, and/or a browser extension. However, the users may also interact with the route management system 106 via a third-party application, such as a web browser or messaging application, that resides on the client device 104 and is configured to communicate with the route management system 106. In either case, the client-side application presents a user interface (UI) or GUI for the user to interact with the route management system 106. For example, the user interacts with the route management system 106 via a client-side application integrated with the file system or via a webpage displayed using a web browser application.

The UI of the client-side application can allow an end user to review one or more notifications representing D&M events associated with an ELD of a vehicle 102. The UI can receive input from the user that selects a given one of the D&M events. In response, the UI can present a set of instructions for resolving the D&M events and transmitting a status of the D&M event to a fleet manager device.

As discussed earlier, the route management system 106 enables fleet managers to generate and track vehicle routes. For example, the route management system 106 may provide a UI that allows fleet managers to generate vehicle routes. A vehicle route is a route to be traversed by a vehicle 102 that is defined by a set of route variables. For example, the set of route variables may include a beginning and ending geographic location of the route, scheduled geographic stops along the route, geographical locations of such stops or destinations, geofences associated with each stop or destination, scheduled amount of time to be spent at each stop before departing to a subsequent stop or destination, an order at which the vehicle 102 is to stop at each scheduled stop, a scheduled beginning and ending time of the route, a scheduled arrival and departure time at the scheduled stops, and the like.

In some examples, a vehicle 102 can be provided multiple routes each including a respective set of route variables. The multiple routes may include some of the same stops or destinations (e.g., stops or destinations may overlap between routes) or the multiple routes may include exclusively unique stops or destinations. A vehicle 102 may only traverse one route at a time. Namely, the vehicle 102 can drive along a selected route to each stop of the selected route and such stops are tracked for the selected route. Stops of other routes that have not been selected may not be tracked while the vehicle is navigating or driving along a selected route. For example, if two routes include a same particular stop or destination (e.g., include two stops with overlapping geofences), when the vehicle 102 reaches or crosses a geofence of the particular stop or destination associated with a first of the routes which is currently an active route (e.g., because the route was selected for navigation), the particular stop or destination is marked completed in association with the first of the routes but remains incomplete or scheduled in association with a second of the two routes.

The UI provided by the route management system 106 enables fleet managers to select the set of route variables to define a route. For example, the UI may provide a listing of geographic locations and times that a fleet manager may select from to define a route. A fleet manager may use the UI to select geographic locations to be included in the route, such as a beginning location, end location, geographical locations of such stops or destinations, geofences associated with each stop or destination, scheduled amount of time to be spent at each stop before departing to a subsequent stop or destination, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet manager to select which route is currently active and which are inactive for a particular vehicle 102. The UI may also provide notifications or alerts associated with an active route indicating stops along the route and/or whether a vehicle 102 is early or late with respect to the scheduled arrival/departure time of one or more stops.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the UI may enable an administrator to enter data identifying a vehicle 102 or vehicle operator, as well as enter a new vehicle 102 or vehicle operator.

The route management system 106 provides for automated tracking of the vehicles 102 based on the routes assigned by the fleet manager. For example, the route management system 106 receives sensor data describing the current location and/or motion of the vehicle 102, which the route management system 106 uses to track location of the vehicle 102 and to compute/update estimated times of arrival (ETAs) of stops along the route. As referred to herein, the terms "stop," "destination," and "location" may be used interchangeably and may have the same meaning. The sensor data may be received from the vehicle 102 and/or from a client device 104 of the vehicle operator in real time or periodically.

The route management system 106 uses the set of route variables defining a route along with the sensor data describing the geographic location and/or movement of the vehicle 102 to generate a route tracking report describing the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include some or all of the information of the route including the route variables.

In some examples, the route tracking report can include historical, current and future route information. Namely, the route tracking report can include information that identifies a list of routes previously assigned and completed or partially completed by a driver. The route tracking report can include currently assigned routes that are actively being driven and/or completed. The route tracking report can include routes assigned in the future to be driven at a future date. Such routes can include updates or changes which are tracked and stored by the route tracking report. The route tracking report can include ELD data for each vehicle 102 and/or driver that specifies the HOS and various other parameters of the vehicle 102 and/or driver.

The route management system 106 uses geofences to determine when vehicles 102 have arrived and/or departed from scheduled stops along a route. A geofence is a virtual perimeter for a real-world geographic area. Geofences are established to encompass each scheduled stop along a route. The route management system 106 uses the geofences along with location data describing the current location of the vehicles 102 to determine whether the vehicles 102 have arrived and/or departed the scheduled stops. For example, the route management system 106 may determine that a vehicle 102 has arrived at a scheduled stop if the current location of the vehicle 102 has been within the geofence encompassing the scheduled stop for a threshold period of time. In such cases, the route management system 106 may mark or set the corresponding stop to a completed state. Similarly, the route management system 106 may determine that the vehicle 102 has departed the scheduled stop if the current location of the vehicle 102 is subsequently outside of the geofence encompassing the scheduled stop for another threshold period of time. The stops along a route can be navigated to sequentially or in any arbitrary order. Regardless of the order in which the stops are navigated to, the route management system 106 automatically sets a given stop of a given route to a completed state in response to determining that the given route is in the active route state and that the current location of the vehicle is within the geofence associated with the given stop.

Figure 2:
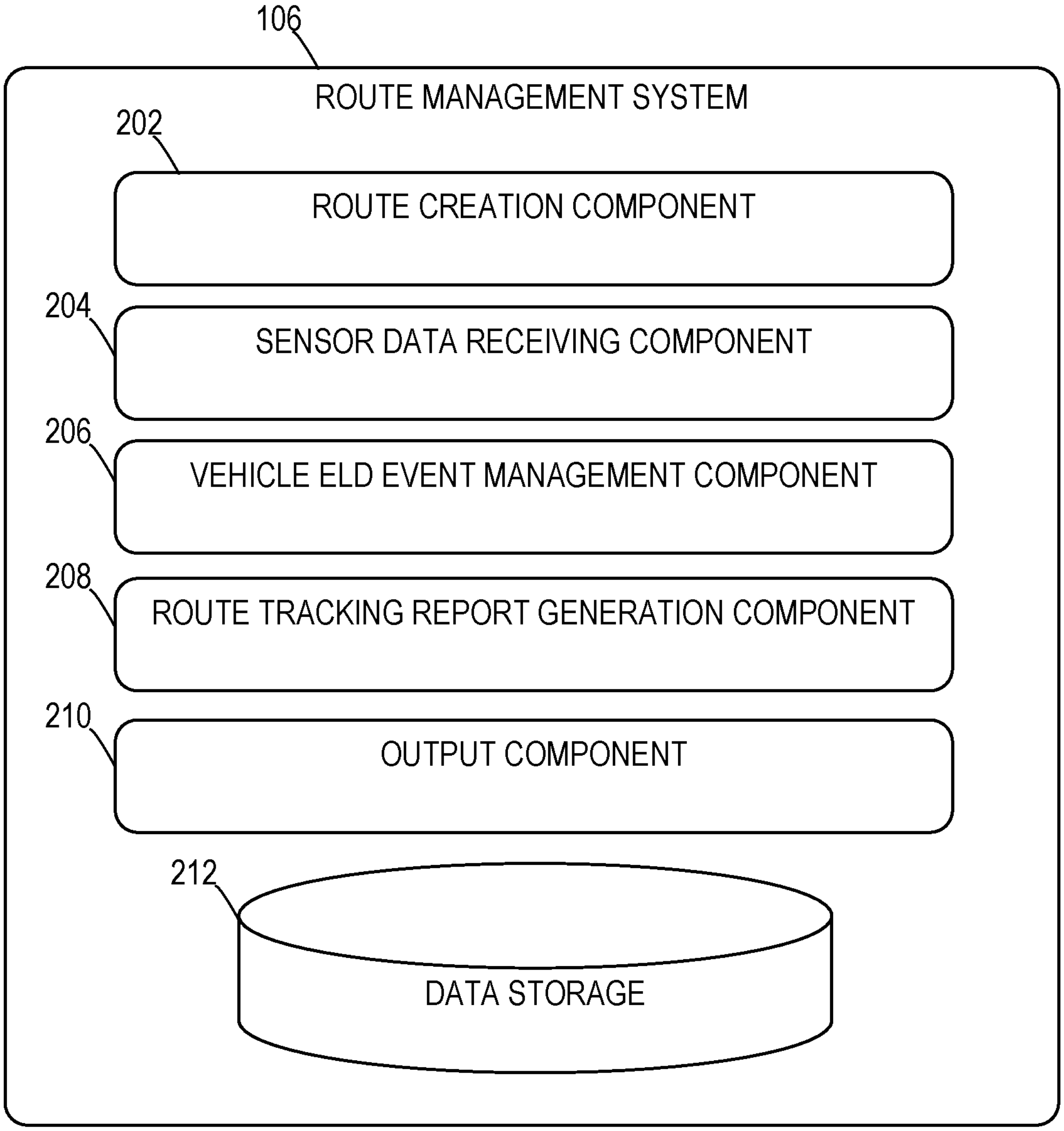
FIG. 2 is a block diagram of a route management system, according to some example embodiments.

FIG. 2 is a block diagram of the route management system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the route management system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the route management system 106 includes a route creation component 202, a sensor data receiving component 204, a vehicle ELD event management component 206, a route tracking report generation component 208, an output component 210, and a data storage 212.

The route creation component 202 enables fleet managers to generate routes and assign routes to vehicles 102. For example, the route creation component 202 may provide a UI that allows fleet managers to generate vehicle routes. A vehicle route is a route to be traversed by a vehicle 102 that is defined by a set of route variables, discussed above. For example, the set of route variables may include a beginning and ending geographic location of the route, scheduled geographic stops along the route, an order at which the vehicle 102 is to stop at each scheduled stop, a scheduled beginning and ending time of the route, a scheduled arrival and departure time at the scheduled stops, and the like. The route variables may also include geographical locations of such stops or destinations, geofences associated with each stop or destination, and/or scheduled amount of time to be spent at each stop before departing to a subsequent stop or destination. The route variables may be stored as part of a route tracking report in data storage 212. The route creation component 202 can also allow fleet managers to designate or enable mixed-use settings for certain vehicles 102, drivers, and/or users.

The UI provided by the route creation component 202 enables fleet managers to select the set of route variables for a route. For example, the UI may provide a listing of geographic locations and times that a fleet manager may select from to define a route. A fleet manager may use the UI to select geographic locations to be included in the route, such as a beginning location, end location, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet managers to specify geographical locations of such stops or destinations, geofences associated with each stop or destination, and/or scheduled amount of time to be spent at each stop before departing to a subsequent stop or destination.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the user interface may enable an administrator to enter data identifying a vehicle 102 or vehicle operator, as well as enter a new vehicle 102 or vehicle operator. The UI may also enable the fleet managers to specify which of a set of routes assigned to a given vehicle 102 is currently active and being tracked. In some examples, the UI can be presented to a driver to enable the driver to manually select which routes are currently active and/or to switch from one route being in the active state to another route being in the active state from a scheduled state. Tracking a route includes determining whether stops along the route have been completed or are scheduled for arrival. Stops that are being tracked can be used to generate ETAs of the corresponding stops.

As referred to herein, routes that are in the active state have their associated stops tracked for completion, such that when a geofence of a given one of the stops is broken or reached by the current location of the vehicle, the stop is marked or set to a completed state. Routes that are in the inactive, completed, or scheduled state do not currently have their stops tracked. In such cases, when the geofence of such routes is broken or reached by the current location of the vehicle, the corresponding stop remains in the scheduled, completed, skipped, or inactive state. In some examples, only one route at a time can be in the active state. In some examples, multiple routes can be in the active state simultaneously.

The route creation component 202 stores data defining the created routes in the data storage 212, where it can be accessed by other components of the route management system 106. For example, the data stored in the data storage 212 may be associated with an account of the route management system 106 and/or specific vehicles 102 to which the route has been assigned.

The sensor data receiving component 204 can include an ELD and/or communicate with an ELD of certain vehicles 102 to receive sensor data used to provide automated route tracking and detect D&M events. For example, the sensor data receiving component 204 receives sensor data describing the current location and/or motion of a vehicle 102. The sensor data may be received from the vehicle 102 and/or from a client device 104 of the vehicle operator that is operating the vehicle 102.

The route tracking report generation component 208 generates a route tracking report for access by the vehicle ELD event management component 206. The route tracking report describes the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include information on routes tracked in the past for a vehicle 102, routes currently assigned to the vehicle 102, and routes assigned to the vehicle to be driven in the future. In some examples, the route tracking report includes route information for up to 30 days in the past and 30 days in the future, although other suitable time periods can be used.

The vehicle ELD event management component 206 detects an event representing an improper operation of an ELD of a vehicle, such as an M&D event. The vehicle ELD event management component 206, in response to detecting the event, generates, for display, a notification representing the event to a driver of the vehicle and retrieves instructions for resolving the improper operation of the ELD. The vehicle ELD event management component 206 presents the instructions as part of the notification. The vehicle ELD event management component 206 coordinates communicating the event and a resolution status of the event to a fleet manager of the vehicle.

In some examples, vehicle ELD event management component 206 stores a list of conditions associated with different types of improper operations of the ELD of the vehicle. The vehicle ELD event management component 206 accesses data associated with the ELD and determines that the data corresponds to one or more of the conditions on the list to detect the event. In some cases, the list of conditions includes at least one of a power compliance diagnostic, a power compliance malfunction, an engine synchronization diagnostic, an engine synchronization malfunction, a timing malfunction, a positioning malfunction, a data recording malfunction, a missing required data elements diagnostic, an unidentified driving diagnostic, a data transfer diagnostic, or a data transfer malfunction.

In some examples, the vehicle ELD event management component 206 generates the notification for display by displaying a graphical user interface (GUI) to the driver that includes an identifier of the event, the GUI comprising an hours of service (HOS) portion. The identifier can represent a plurality of events of different improper operations of the ELD. The vehicle ELD event management component 206 receives input that selects the identifier and, in response to receiving the input, presents information that identifies the event and the instructions.

In some examples, the vehicle ELD event management component 206 determines a type associated with the event. The vehicle ELD event management component 206, in response to determining that the type of the event corresponds to a first type of event, removes the identifier of the event in response to determining that the improper operation of the ELD has been resolved. In response to determining that the type of the event corresponds to a second type of event, the vehicle ELD event management component 206 removes the identifier of the event after a threshold period of time (e.g., 8 days) from when the event was detected regardless of when the improper operation of the ELD has been resolved. For example, the second type of event may correspond to an unidentified driving diagnostic condition.

In some examples, the vehicle ELD event management component 206 presents a list of unclaimed driving segments in response to receiving a request to resolve the unidentified driving diagnostic condition. The vehicle ELD event management component 206 receives input that selects one or more of the unclaimed driving segments from the list to resolve the unidentified driving diagnostic condition. The vehicle ELD event management component 206 displays on a fleet manager device a graphical user interface (GUI) comprising a list of events representing improper operations of ELDs of a plurality of vehicles and displays a resolution status of each event on the list. In some cases, the GUI displays a timestamp of when each of the events was detected, a type of the event, an identifier of each of the plurality of vehicles, a driver associated with each respective one of the plurality of vehicles, the resolution status, and a number of days left until a deadline for resolving each of the events.

In some examples, the vehicle ELD event management component 206 presents the GUI including an option to filter the events based on a specified range of dates and resolution status. The vehicle ELD event management component 206 receives input from the GUI that selects a given event from the list of events. The GUI displays a notes region to enable the fleet manager to input an annotation for the given event in response to receiving the input. The GUI displays instructions for resolving the given event in response to receiving the input and displays an option for contacting the driver in response to receiving the input.

The output component 210 provides the route tracking report (e.g., the GUI including the M&D event status of a plurality of vehicles 102) to a fleet manager or other user. For example, the output component 210 may transmit the route tracking report to the client device 104 of a fleet manager or other user via email, text message, and the like. As another example, the output component 210 may provide the route tracking report within a user interface that can be accessed by a fleet manager. For example, a fleet manager may use a client device 104 to interact with the route management system 106 and to access the user interface provided by the output component 210.

The output component 210 may also transmit notifications based on the data included in a route tracking report. For example, the output component 210 may transmit a notification to a client device 104 of a vehicle operator indicating that the vehicle operator has missed a scheduled stop, is behind schedule, is not following the correct route, instructions for resolving an M&D event, and the like. Similarly, the output component 210 may transmit a notification to a client device 104 of a fleet manager or other user to provide status updates associated with a route, such as the vehicle 102 having started at a route, arriving at a scheduled stop, left a scheduled stop, missed a scheduled stop, completed the route, and the like.

Figure 3:
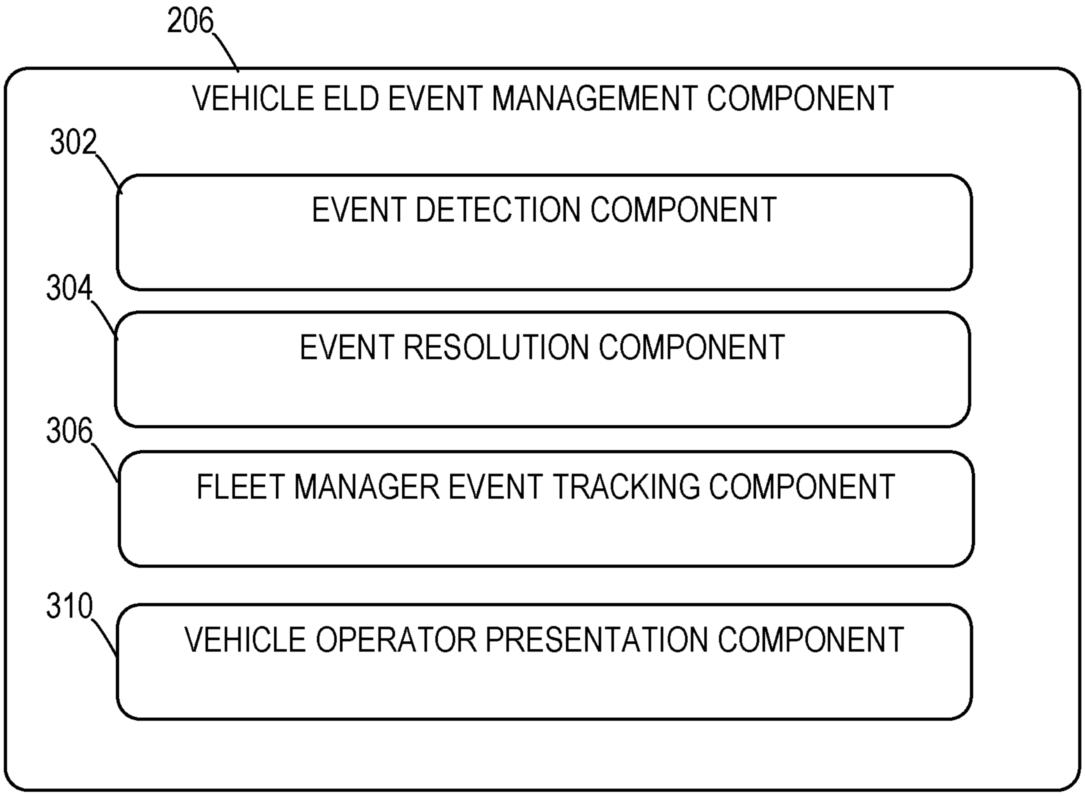
FIG. 3 is a block diagram of a vehicle ELD event management component, according to some example embodiments.

As shown in FIG. 3, the vehicle ELD event management component 206 may include an event detection component 302, an event resolution component 304, a fleet manager event tracking component 306, and a vehicle operator presentation component 310.

The event detection component 302 can be installed in a vehicle 102 or associated with one or more vehicles 102. The event detection component 302 can receive data from an ELD of one or more vehicles. The event detection component 302 can store one or more conditions that represent different M&D events.

For example, the event detection component 302 can store a power compliance diagnostic condition that is triggered in response to data indicating that the vehicle 102 is unable to read a power status of the engine. The event detection component 302 can store a power compliance malfunction condition that is triggered if data of the vehicle 102 recorded over 30 minutes of driving time without power. The event detection component 302 can store an engine synchronization diagnostic condition that is triggered when a vehicle gateway device is unable to read engine data. The event detection component 302 can store an engine synchronization malfunction condition that is triggered if data of the vehicle 102 recorded over 30 minutes of driving time without engine data. The event detection component 302 can store a timing malfunction condition that is triggered when an ELD clock is out of synch. The event detection component 302 can store a positioning malfunction condition that is triggered if the vehicle gateway recorded over 60 minutes of driving time without location information. The event detection component 302 can store a data recording malfunction condition that is triggered if there is an issue with recording data, such as being unable to save data to a vehicle gateway, a client device 104 associated with the vehicle 102, or both. The event detection component 302 can store a missing required data elements diagnostic condition that is triggered if location is missing from a duty status change that is made on a certain day. The event detection component 302 can store an unidentified driving diagnostic condition that is triggered if the vehicle gateway recorded over 30 minutes of driving time without an assigned driver. The event detection component 302 can store a data transfer diagnostic condition that is triggered if there is an issue with transferring data. The event detection component 302 can store a data transfer diagnostic malfunction that is triggered if there is an issue with transferring data.

The event detection component 302 continuously or periodically receives data from one or more vehicles. The event detection component 302 compares the received data to the stored conditions. In response to determining that the data received from a given vehicle 102 matches one or more of the conditions, the event detection component 302 triggers an M&D event representing the one or more conditions that have been triggered. For example, the event detection component 302 communicates with the vehicle operator presentation component 310 an identification of the one or more M&D events that have been triggered by the satisfaction of the corresponding one or more conditions. The vehicle operator presentation component 310 generates a notification for presentation to a driver of the vehicle 102 representing the identified M&D events.

Figure 5:
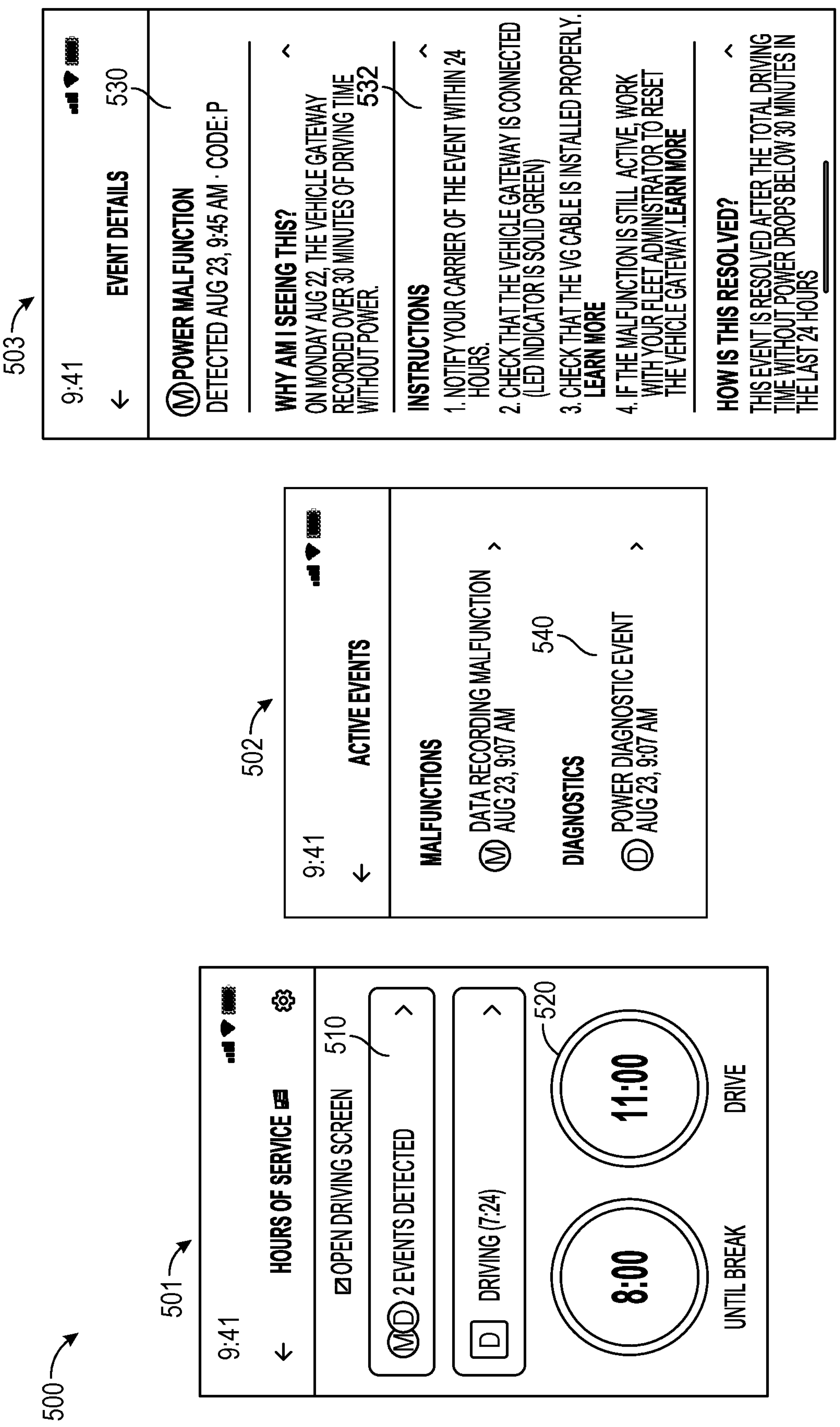
FIGS. 5, 6, 7A and 7B are example user interfaces for managing ELD events of vehicles, according to some example embodiments.

For example, as shown in FIG. 5, the vehicle operator presentation component 310 can present a set of user interfaces 500. The user interfaces 500 include a user interface 501 that includes an indicator 510 of one or more M&D events that have been identified and detected by the event detection component 302. In some cases, if only one M&D event has been detected, the indicator 510 includes a name associated with or representing the M&D event. In some cases, if multiple M&D events have been triggered, the indicator 510 provides icons representing each triggered event and a number representing a quantity of M&D events that have been triggered. The user interface 501 also includes an HOS region in which HOS are presented to the driver.

In some examples, the indicator 510 represents a single M&D event. In such cases, the user interface 501 receives input from the driver, such as tapping on the indicator 510. In response to the input, a user interface 503 is directly presented which includes a description of the M&D event 530 and one or more textual, audible, and/or video instructions 532 for resolving the M&D event. In some examples, the indicator 510 represents multiple M&D events. In such cases, in response to the user interface 501 receiving input from the driver, such as tapping on the indicator 510, the vehicle operator presentation component 310 presents a user interface 502 that lists each of the triggered M&D events. For example, the user interface 502 includes a first region associated with malfunction events and a second region associated with diagnostic events. The vehicle operator presentation component 310 presents malfunction events with their associated names in the first region and presents diagnostic events with their associated names in the second region. In response to receiving input that selects a given event 540 of the listed events from the user interface 502, the vehicle operator presentation component 310 retrieves data associated with the M&D event 530 that has been selected as a given event 540 and presents the user interface 503 which includes a description of the given event 540 and one or more textual, audible, and/or video instructions 532 for resolving the M&D event 530.

In some examples, to generate the user interface 503, the vehicle operator presentation component 310 communicates with the event resolution component 304 to obtain the instructions 532 that are presented in the user interface 503. For example, the vehicle operator presentation component 310 can retrieve an identifier of the event that is presented in the user interface 503 and provides the identifier to the event resolution component 304. The event resolution component 304 searches a database of known resolutions associated with the identifier to retrieve the instructions 532.

For example, the event resolution component 304 can receive a power compliance diagnostic event identifier and can store an association between the power compliance diagnostic event identifier and one or more resolution instructions. The one or more resolution instructions can include instructions to check that the vehicle gateway is connected and that the cable is installed properly.

As another example, the event resolution component 304 can receive a power compliance malfunction event identifier and can store an association between the power compliance malfunction event identifier and one or more resolution instructions. The one or more resolution instructions can include instructions to notify the carrier of the event within 24 hours, check that the vehicle gateway is connected and that the cable is installed properly.

As another example, the event resolution component 304 can receive an engine synchronization diagnostic identifier and can store an association between the engine synchronization diagnostic identifier and one or more resolution instructions. The one or more resolution instructions can include instructions to check that the vehicle gateway is connected and that the cable is installed properly.

As another example, the event resolution component 304 can receive an engine synchronization malfunction identifier and can store an association between the engine synchronization malfunction identifier and one or more resolution instructions. The one or more resolution instructions can include instructions to notify the carrier of the event within 24 hours, check that the vehicle gateway is connected and that the cable is installed properly.

As another example, the event resolution component 304 can receive a timing malfunction identifier and can store an association between the timing malfunction identifier and one or more resolution instructions. The one or more resolution instructions can include instructions to notify the carrier of the event within 24 hours, verify that the time on the client device 104 is being automatically synchronized, and if not, to restart the client device 104.

As another example, the event resolution component 304 can receive a positioning malfunction identifier and can store an association between the positioning malfunction identifier and one or more resolution instructions. The one or more resolution instructions can include instructions to notify the carrier of the event within 24 hours.

As another example, the event resolution component 304 can receive a data recording malfunction identifier and can store an association between the data recording identifier and one or more resolution instructions. The one or more resolution instructions can include instructions to notify the carrier of the event within 24 hours and record paper logs until the malfunction is resolved.

As another example, the event resolution component 304 can receive a missing required data elements diagnostic identifier and can store an association between the missing required data elements diagnostic identifier and one or more resolution instructions. The one or more resolution instructions can include instructions to check that the vehicle gateway is connected and that the cable is installed properly. The instructions can indicate to review past duty status change records and ensure that a valid location is present.

Figure 6:
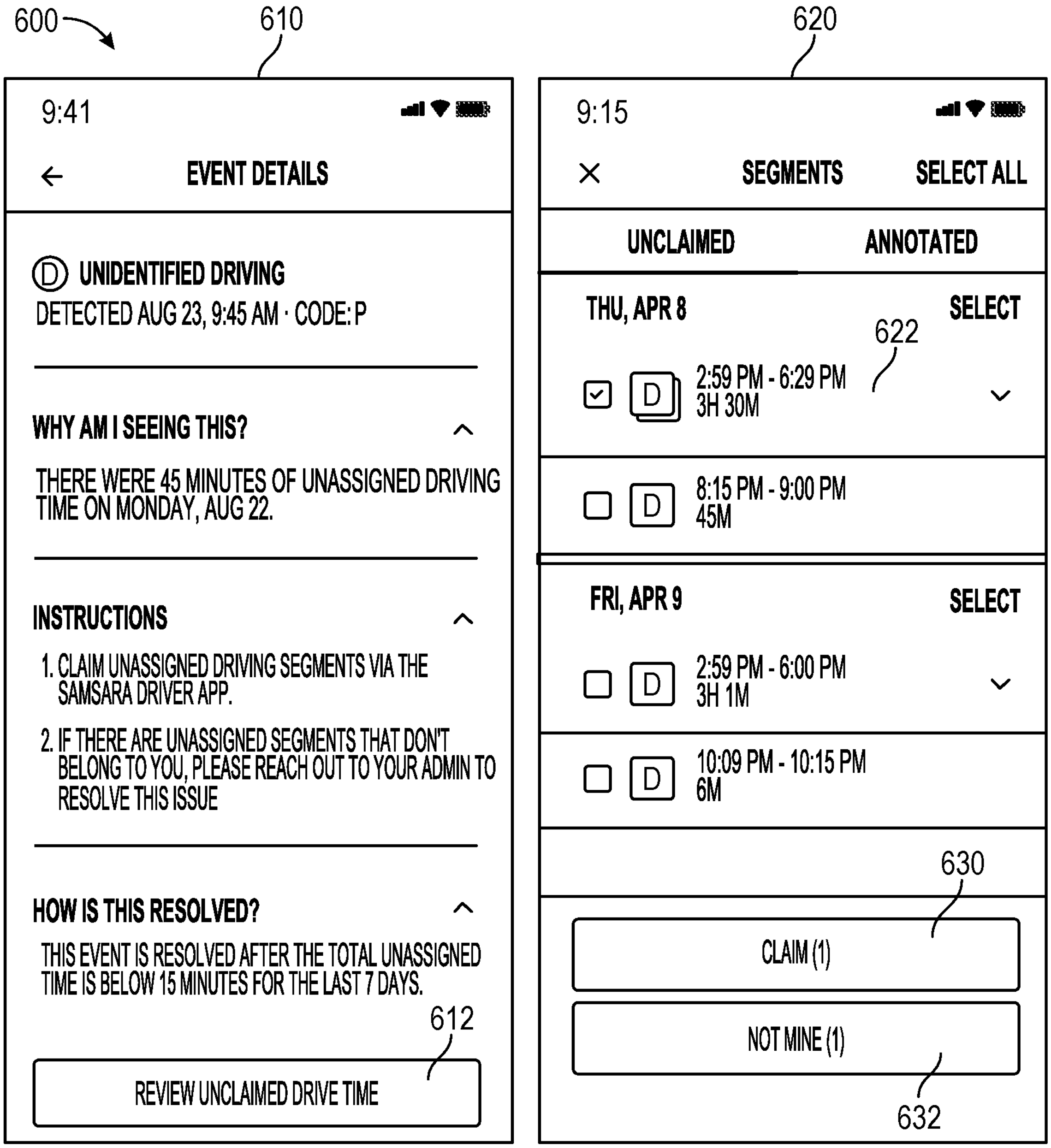

As another example, the event resolution component 304 can receive an unidentified driving diagnostic identifier and can store an association between the unidentified driving diagnostic identifier and one or more resolution instructions. The one or more resolution instructions can include instructions to claim unassigned driving segments. In such circumstances, the event resolution component 304 can send a message to the vehicle operator presentation component 310 to present an option to review unclaimed drive time. For example, as shown in FIG. 6, a set of user interfaces 600 are presented to address the unidentified driving diagnostic condition that is detected. The user interfaces include a user interface 610 that includes similar information and is navigated to in a similar manner as user interface 503.

In some examples, the user interface 610 includes an option 612 to review unclaimed drive time. In response to receiving a user input that selects the option 612, the vehicle operator presentation component 310 presents the user interface 620. Specifically, the vehicle operator presentation component 310 retrieves a list of unclaimed drive segments that resulted in the triggering of the unidentified driving diagnostic condition. The vehicle operator presentation component 310 presents the list of unclaimed drive segments and receives a user input that selects a first unclaimed drive segment 622. The vehicle operator presentation component 310 can receive a user input that selects a claim option 630. In response to selection of the claim option 630, the vehicle operator presentation component 310 associates the selected drive segment 622 with the driver to which the user interface 620 is presented. The vehicle operator presentation component 310 can receive a user input that selects a not mine option 632. In response to receiving the input that selects the not mine option 632, the vehicle operator presentation component 310 disassociates the selected drive segment 622 from the driver to which the user interface 620 is presented. After the drive segments are claimed, the unidentified driving diagnostic event (or condition) is resolved.

The vehicle operator presentation component 310 can determine types of the events that are presented or represented by the indicator 510. The vehicle operator presentation component 310 can determine that certain types of events can immediately be removed from being represented by the indicator 510 after the conditions that triggered the events are addressed. These can be referred to as first types of events. The vehicle operator presentation component 310 can determine that certain other types of events are not removed from being represented by the indicator 510 until a threshold period of time elapses since the events have been triggered. In such cases, even if the conditions that triggered such events are resolved, the vehicle operator presentation component 310 continues to present the events in the indicator 510 until the threshold period of time elapses (e.g., 8 days).

Figure 7A:
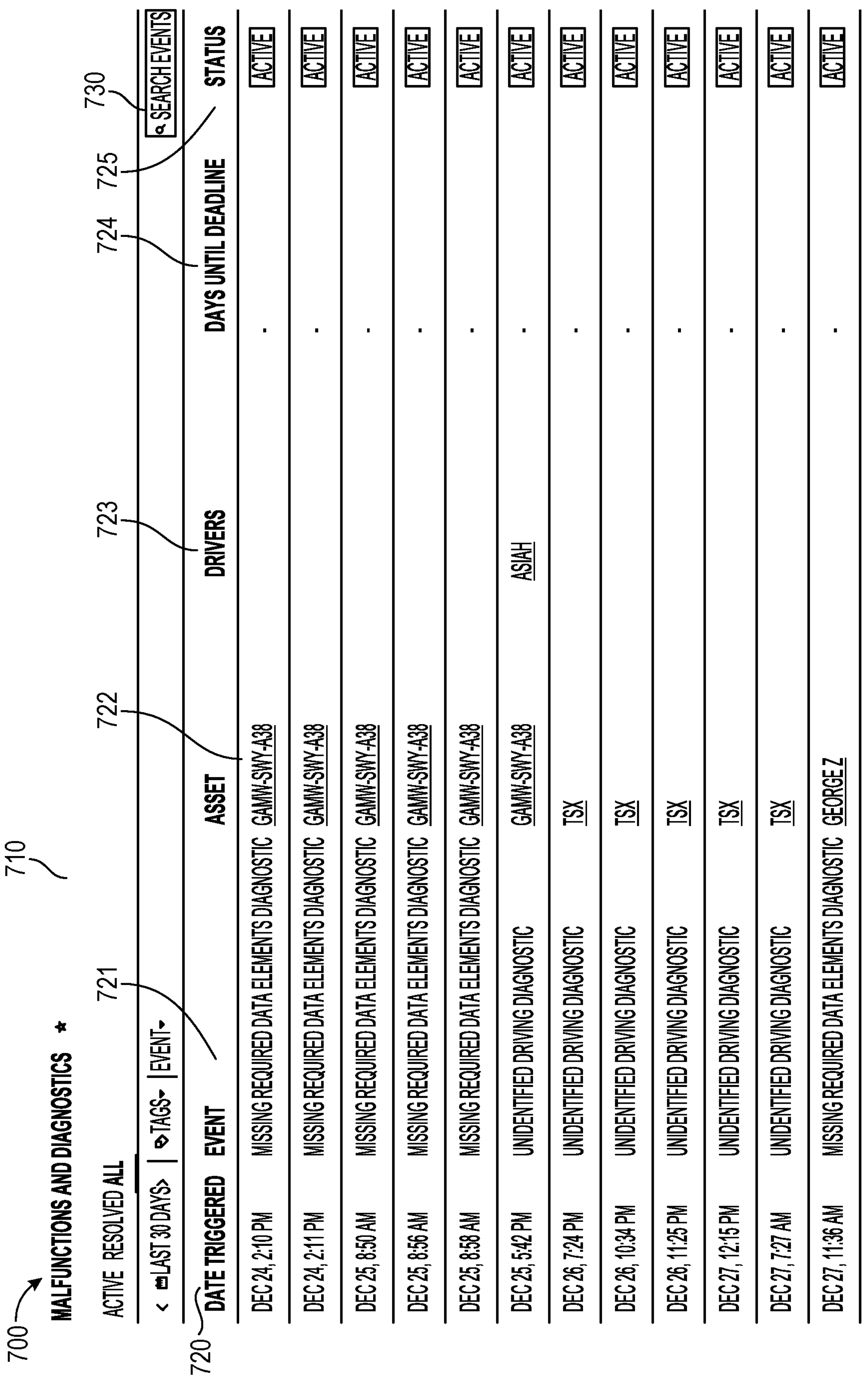

In some examples, the event detection component 302 transmits a message or communication to the fleet manager event tracking component 306 that identifies the M&D event that has been triggered. This transmission can take place concurrently or after transmitting the instruction to the vehicle operator presentation component 310 to present a notification informing a driver of the vehicle 102 about the event. The fleet manager event tracking component 306 can add an identifier of the vehicle 102 and the name and timestamp when the event was triggered to a user interface that is presented to an administrator or fleet manager on a client device 104. The fleet manager event tracking component 306 can present a user interface to a fleet manager, such as the user interface 700, shown in FIG. 7A.

For example, the user interface 700 can include a display 710 with a list of different M&D events 720 that have been triggered across one or more vehicles 102 associated with a fleet managed by the fleet manager. Each M&D event that is listed in the display 710 can include an event name 721 (which corresponds to the condition that triggered the M&D event), an asset identifier 722 which identifies the vehicle 102 for which the M&D event was triggered, a driver identifier 723 representing the driver of the vehicle 102 on which the event was triggered, a days until a deadline to resolve 724, and a status 725 which indicates a resolution status of each event. In response to receiving a communication from a driver client device 104 that an event has been resolved successfully, the fleet manager event tracking component 306 automatically updates the status 725 for the particular event that was resolved. The days until a deadline to resolve 724 specifies how long or how much time is left before failing to resolve a given event triggers a violation or fails compliance with rules and regulations.

Figure 7B:
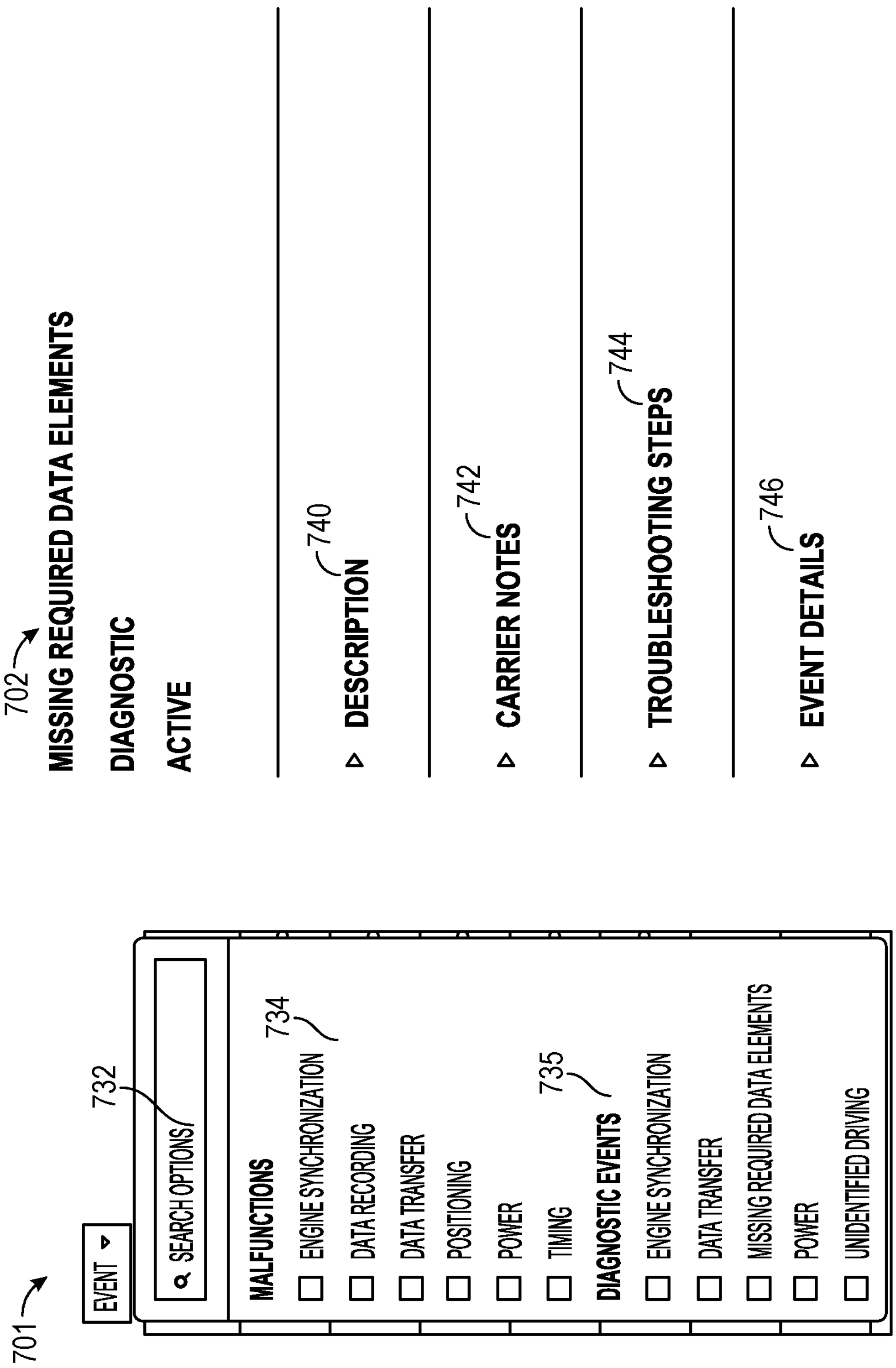

In some examples, the user interface 700 includes a search region 730. The search region 730 enables a fleet manager to sort and filter the list of different M&D events 720 that are included in the display 710. For example, in response to receiving input that selects the search region 730, a search interface 701, shown in FIG. 7B, is presented. The search interface 701 allows a fleet manager to specify one or more filtering criteria, such as specific types of diagnostics and malfunctions, specific drivers, specific vehicles, and/or specific ranges of dates. This allows the fleet manager to view past M&D events and current M&D events and to prioritize those M&D events that are coming close to the compliance deadline.

In some examples, in response to receiving input that selects a given event identified in the list of different M&D events 720, a user interface 702, shown in FIG. 7B, is presented. The user interface 702 includes a description region 740, a carrier notes region 742, a troubleshooting steps region 744, and an event details region 746. The description region 740 provides a description of the event that is selected and the causes that triggered the event and ways to resolve it. The ways to resolve the event can be the same as the instructions that are presented to the driver, such as the instructions 532. The carrier notes region 742 allows the administrator to input annotation specifying progress of resolving the event or other issues. The troubleshooting steps region 744 lists one or more instructions for providing to a driver who is unable to resolve the event. The event details region 746 provides information about the event including a time and location at which the event was triggered. As referred to herein, triggering an event or an event being triggered means that one or more conditions associated with the event have been detected as being satisfied by the event detection component 302. In some cases, the user interface 702 includes an option to contact or communicate with the driver associated with the event.

Figure 4:
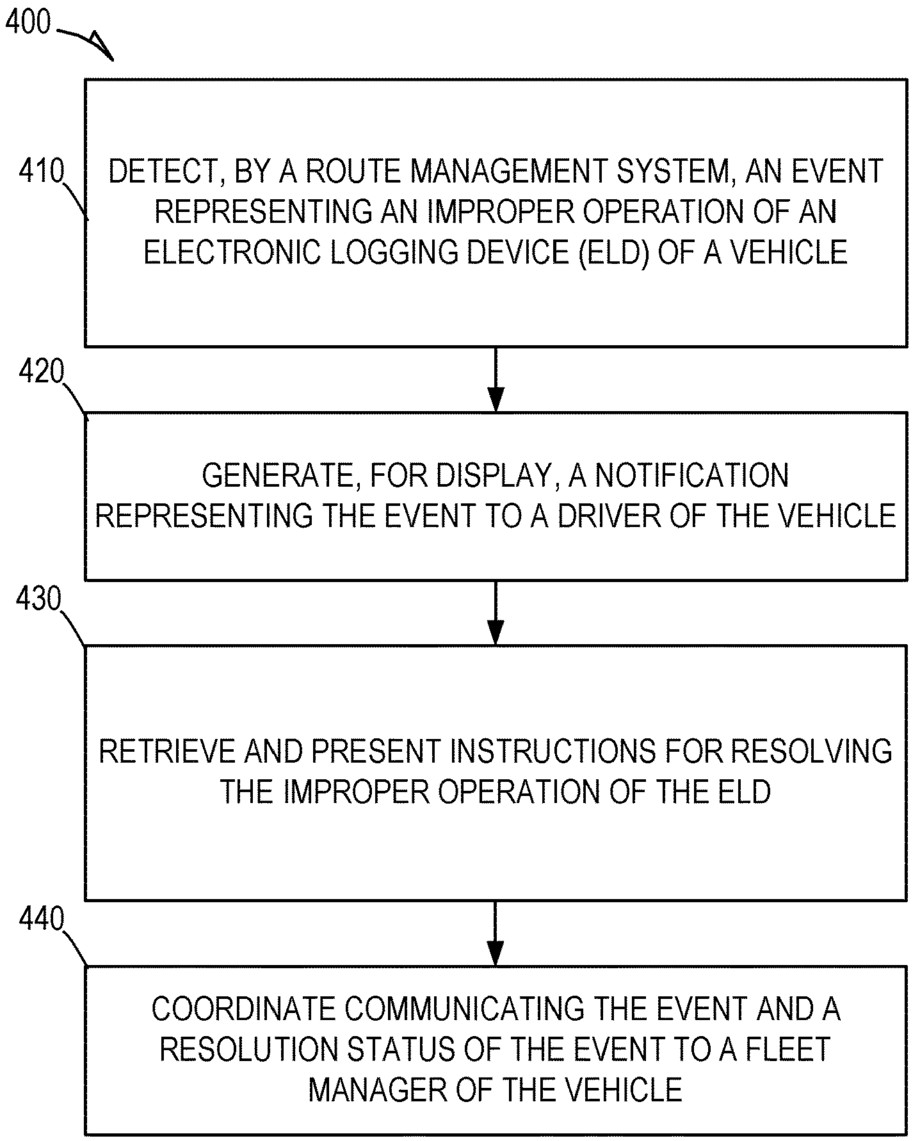
FIG. 4 is a flowchart showing a process for managing ELD events of vehicles, according to some example embodiments.

FIG. 4 is a flowchart showing a process 400 for manually starting assigned routes, according to some example embodiments. The process 400 may be embodied in computer-readable instructions for execution by one or more processors such that the operations of the process 400 may be performed in part or in whole by the route management system 106; accordingly, the process 400 is described below by way of example with reference thereto. However, it shall be appreciated that at least some of the operations of the process 400 may be deployed on various other hardware configurations and the process 400 is not intended to be limited to the route management system 106.

At operation 410, the route management system 106 detects an event representing an improper operation of an ELD of a vehicle, as discussed above.

At operation 420, the route management system 106, in response to detecting the event, generates, for display, a notification representing the event to a driver of the vehicle, as discussed above.

At operation 430, the route management system 106, in response to detecting the event, retrieves and presents instructions for resolving the improper operation of the ELD, as discussed above.

At operation 440, the route management system 106 coordinates communicating of the event and a resolution status of the event to a fleet manager of the vehicle, as discussed above.

Software Architecture

Figure 8:
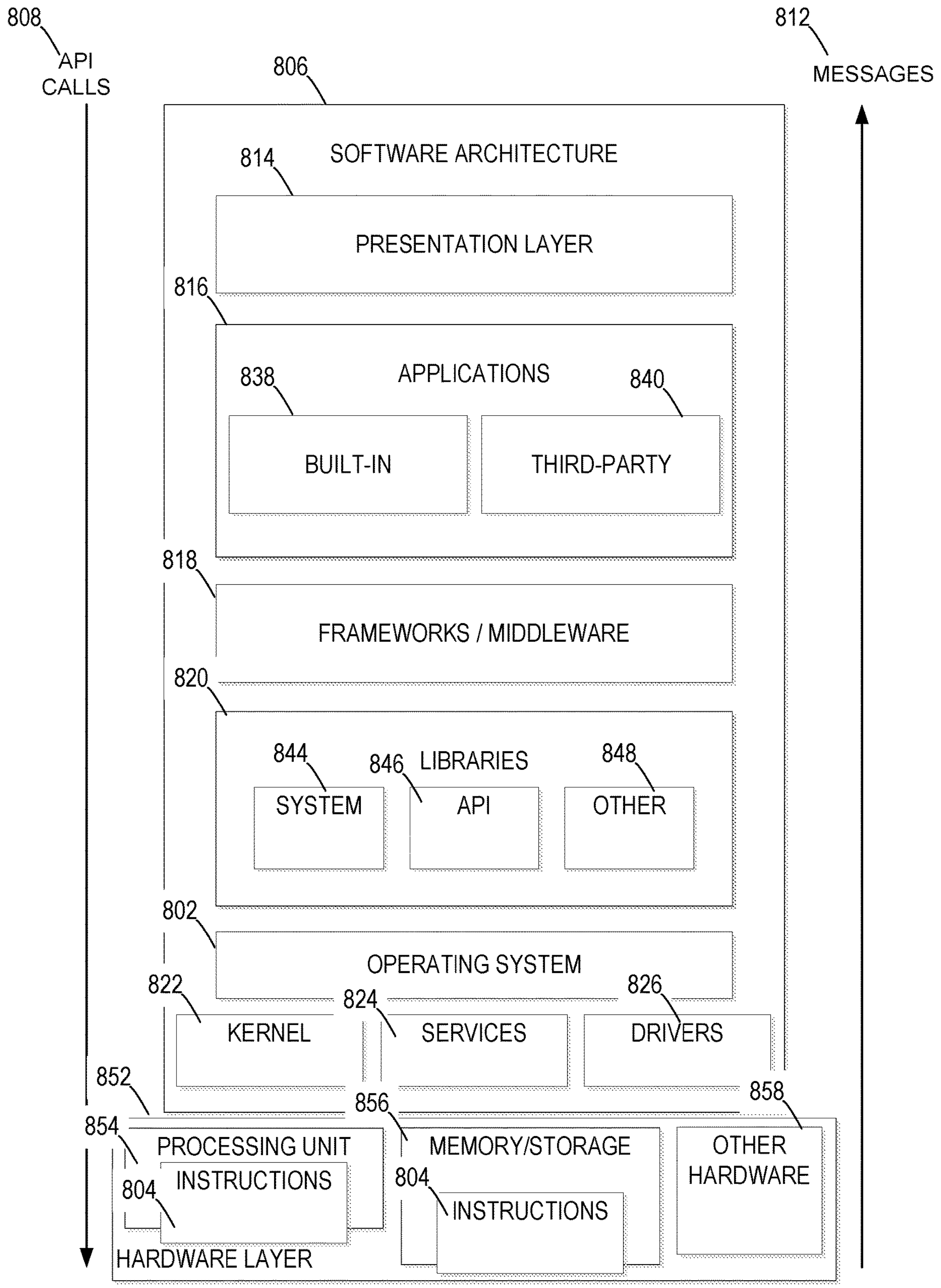
FIG. 8 is a block diagram illustrating an example software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke application programming interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
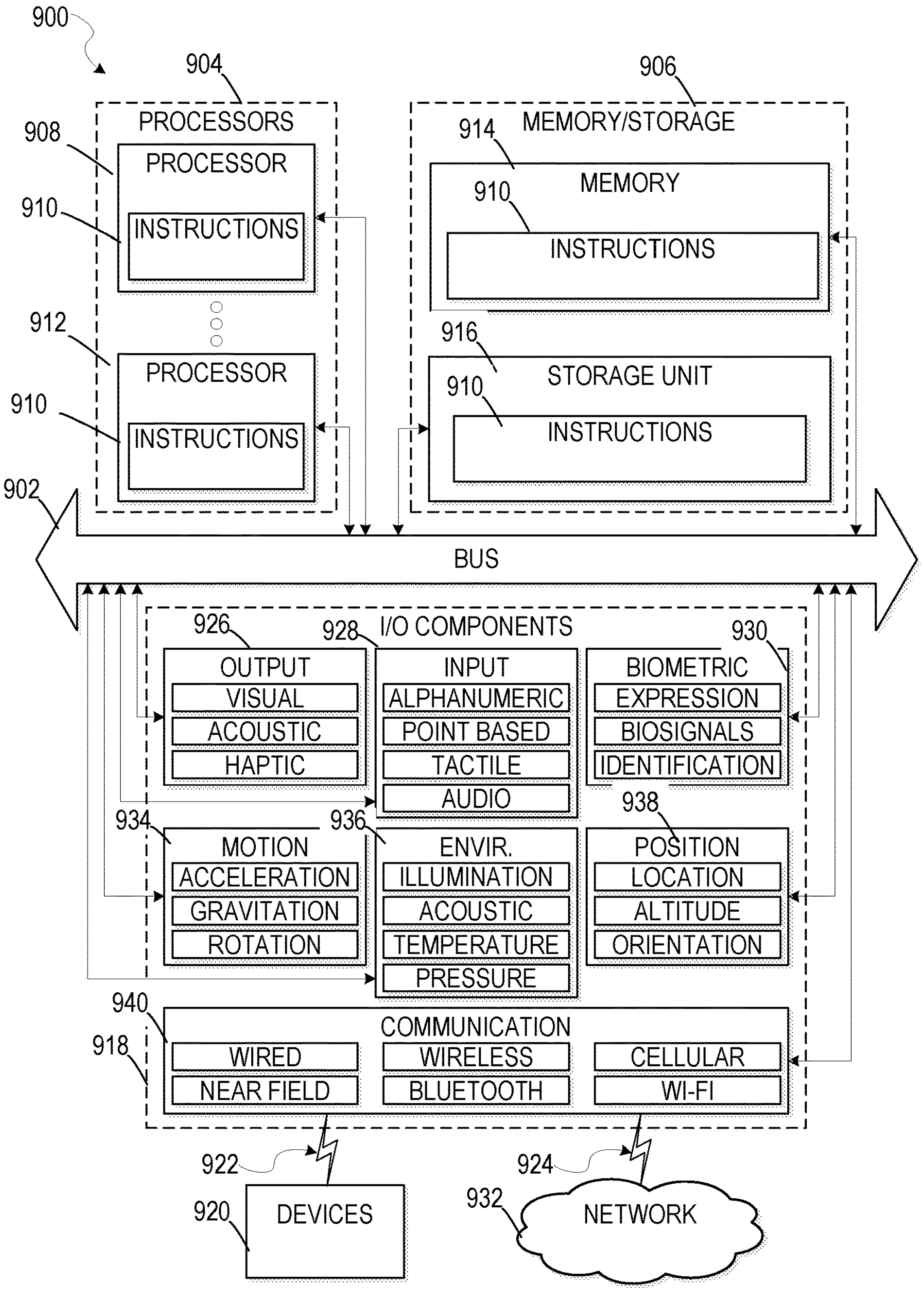
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 904 may further be a multi-core processor having two or more independent processors 904 (sometimes referred to as "cores") that may execute instructions 910 contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:

detecting, by a route management system, an event representing an improper operation of an electronic logging device (ELD) of a vehicle;

in response to detecting the event:

generating, for display, a notification representing the event to a driver of the vehicle;

retrieving instructions for resolving the improper operation of the ELD; and presenting the instructions as part of the notification; and coordinating communicating the event and a resolution status of the event to a fleet manager of the vehicle, the fleet manager being associated with a fleet manager device that performs operations comprising:

displaying on the fleet manager device a graphical user interface (GUI) comprising a list of events representing improper operations of ELDs of a plurality of vehicles including the vehicle; and displaying a resolution status of each event on the list.

2. The method of claim 1, wherein the event includes at least one of a malfunction event or a diagnostic event.

3. The method of claim 1, further comprising:

storing a list of conditions associated with different types of improper operations of the ELD of the vehicle;

accessing data associated with the ELD; and determining that the data corresponds to one or more of the conditions on the list to detect the event.

4. The method of claim 3, wherein the list of conditions includes at least one of a power compliance diagnostic, a power compliance malfunction, an engine synchronization diagnostic, an engine synchronization malfunction, a timing malfunction, a positioning malfunction, a data recording malfunction, a missing required data elements diagnostic, an unidentified driving diagnostic, a data transfer diagnostic, or a data transfer malfunction.

5. The method of claim 1, wherein generating the notification for display comprises:

displaying a GUI to the driver that includes an identifier of the event, the GUI presented to the driver comprising an hours of service (HOS) portion.

6. The method of claim 5, wherein the identifier represents a plurality of events of different improper operations of the ELD.

7. The method of claim 5, further comprising:

determining a type associated with the event.

8. The method of claim 7, further comprising:

in response to determining that the type of the event corresponds to a first type of event, removing the identifier of the event in response to determining that the improper operation of the ELD has been resolved.

9. The method of claim 8, further comprising:

in response to determining that the type of the event corresponds to a second type of event, removing the identifier of the event after a threshold period of time from when the event was detected regardless of when the improper operation of the ELD has been resolved.

10. The method of claim 9, wherein the second type of event corresponds to an unidentified driving diagnostic condition.

11. The method of claim 10, further comprising:

presenting a list of unclaimed driving segments in response to receiving a request to resolve the unidentified driving diagnostic condition; and receiving input that selects one or more of the unclaimed driving segments from the list to resolve the unidentified driving diagnostic condition.

12. The method of claim 1, further comprising:

receiving input that selects an identifier representing a plurality of events of improper operations of the ELD; and in response to receiving the input, presenting information that identifies the event and the instructions.

13. The method of claim 1, wherein the GUI displays a timestamp of when each of the events was detected, a type of the event, an identifier of each of the plurality of vehicles, a driver associated with each respective one of the plurality of vehicles, the resolution status, and a number of days left until a deadline for resolving each of the events.

14. The method of claim 1, wherein the GUI comprises an option to filter the events based on a specified range of dates and resolution status.

15. The method of claim 1, further comprising:

receiving input from the GUI that selects a given event from the list of events, wherein the GUI displays a notes region to enable the fleet manager to input an annotation for the given event in response to receiving the input.

16. The method of claim 15, wherein the GUI displays instructions for resolving the given event in response to receiving the input.

17. The method of claim 15, wherein the GUI displays an option for contacting the driver in response to receiving the input.

18. A system comprising:

one or more computer processors; and one or more computer-readable mediums storing instructions that, when executed by the one or more computer processors, cause the system to perform operations comprising:

detecting, by a route management system, an event representing an improper operation of an electronic logging device (ELD) of a vehicle;

in response to detecting the event:

generating, for display, a notification representing the event to a driver of the vehicle;

retrieving instructions for resolving the improper operation of the ELD; and presenting the instructions as part of the notification; and coordinating communicating the event and a resolution status of the event to a fleet manager of the vehicle, the fleet manager being associated with a fleet manager device that performs operations comprising:

displaying on the fleet manager device a graphical user interface (GUI) comprising a list of events representing improper operations of ELDs of a plurality of vehicles including the vehicle; and displaying a resolution status of each event on the list.

19. A non-transitory computer-readable medium storing instructions that, when executed by one or more computer processors of a system, cause the system to perform operations comprising:

detecting, by a route management system, an event representing an improper operation of an electronic logging device (ELD) of a vehicle;

in response to detecting the event:

generating, for display, a notification representing the event to a driver of the vehicle;

retrieving instructions for resolving the improper operation of the ELD; and presenting the instructions as part of the notification; and coordinating communicating the event and a resolution status of the event to a fleet manager of the vehicle, the fleet manager being associated with a fleet manager device that performs operations comprising:

displaying on the fleet manager device a graphical user interface (GUI) comprising a list of events representing improper operations of ELDs of a plurality of vehicles including the vehicle; and displaying a resolution status of each event on the list.

20. The non-transitory computer-readable medium of claim 19, wherein the event includes at least one of a malfunction event or a diagnostic event.

* * * * *